Jan. 15, 1924.  
E. J. STAHL  
SEAT CONSTRUCTION  
Filed July 13, 1922

1,480,789

INVENTOR.  
E. J. STAHL.  
By Edward R. Alexander  
Attorney

Patented Jan. 15, 1924.

1,480,789

UNITED STATES PATENT OFFICE.

EDWARD J. STAHL, OF CLEVELAND, OHIO, ASSIGNOR TO THE BAKER R. & L COMPANY, OF CLEVELAND, OHIO, A CORPORATION OF OHIO.

SEAT CONSTRUCTION.

Application filed July 13, 1922. Serial No. 574,800.

*To all whom it may concern:*

Be it known that I, EDWARD J. STAHL, a citizen of the United States, residing at Cleveland, in the county of Cuyahoga and State of Ohio, have invented certain new and useful Improvements in and Relating to Seat Construction, of which the following is a specification.

This invention relates to a seat or seat construction, particularly a seat capable of application or installation in a vehicle such as an automobile.

One object of the invention is to provide a folding seat of relatively simple construction, whereby it can be economically manufactured and readily installed.

Another object of the invention is to provide a folding seat in which the foldable elements are so correlated that one serves as a leg to support the seat member upon the floor and the other serves to maintain the supporting element in operative position at all times when the seat is unfolded or in use, whereby the seat may be secured on the vehicle floor independently of a seat back or other support.

Other objects of the invention will be apparent to those skilled in the art to which my invention relates from the following description taken in connection with the accompanying drawings, wherein—

Fig. 2 is a fragmentary perspective view of the seat, with parts broken away to show the position of the main supporting members and folding links or elements when the seat is in its folded position.

Fig. 3 is a view showing the operation of folding or unfolding the seat.

Fig. 4 is a perspective view showing the seat unfolded and in position for use.

Fig. 5 is a view similar to Fig. 4, but showing a slightly modified form of construction embodying the invention.

Figure 1:
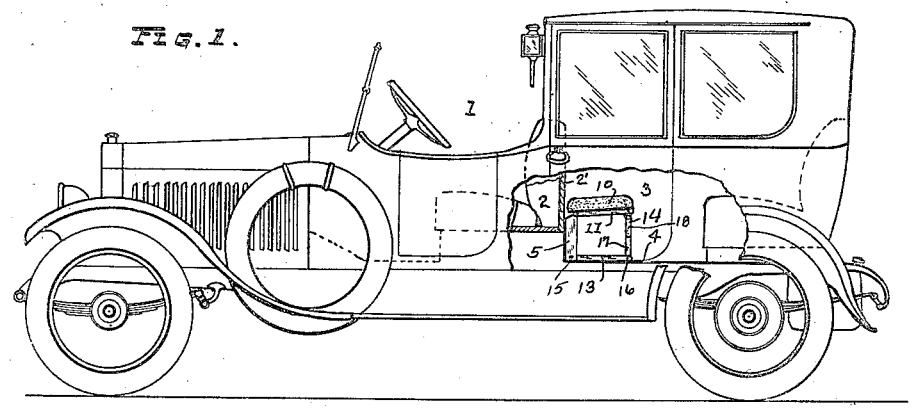
Fig. 1 is a side elevation of a vehicle fitted with a seat embodying my invention (a portion of the vehicle being broken away to show the seat and its manner of application to the floor of the vehicle).
Figure 1:
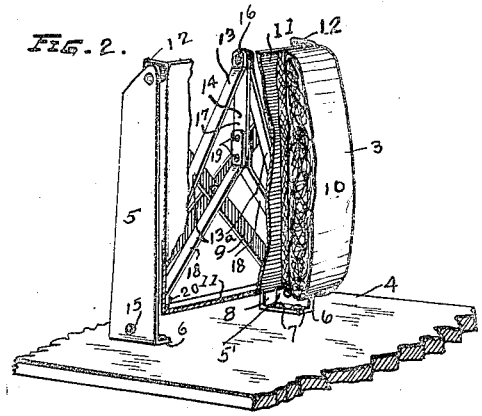
Figure 1:
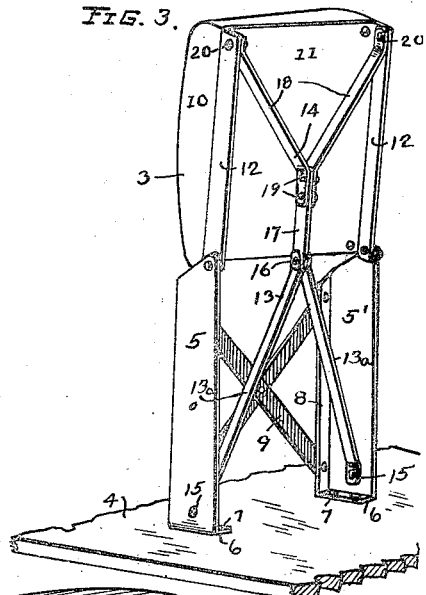
Figure 1:
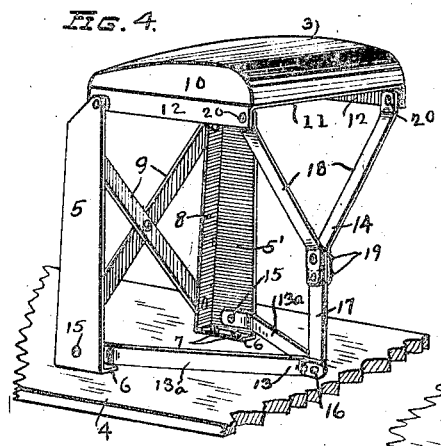
Figure 1:
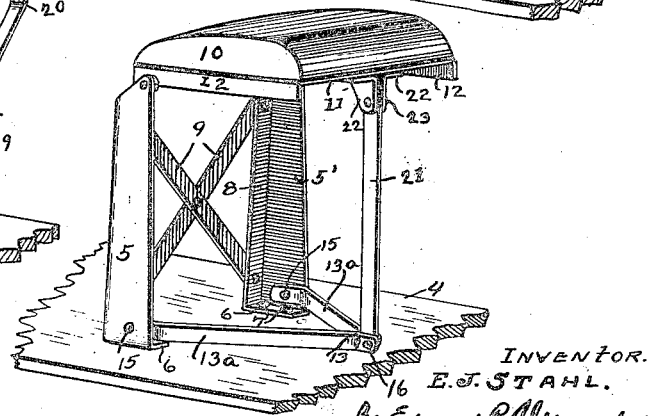

In the drawings, 1 indicates a vehicle of any desired construction having a built-in or permanent seat 2. 3 indicates as an entirety an auxiliary seat applied to or mounted upon the floor 4 of the vehicle, preferably adjacent to the back 2' of the front seat 2.

Referring to the auxiliary seat 3, 5, 5, indicate a pair of uprights which serve as the main supporting members for the seat member to be later referred to. The uprights 5 are provided with feet 6, which are secured to the floor 4 by screws 7 or other suitable means. The uprights 5 are preferably provided along their rear edges with flanges 8, to which are secured cross bars 9—the bars 9 serving to brace the uprights and maintain them in parallel relationship. 10 indicates a seat member, preferably having a base 11 formed from sheet metal. The base 11 is flanged along its oposite side edges, as shown at 12, and the rear ends of the flanges 12 are pivoted in any well known manner to the upper ends of the uprights 5, whereby the seat member may swing upwardly from its normal horizontal position, and then downwardly in front of the uprights 5, as shown in Fig. 2. 13, 14, indicate a pair of folding members pivotally connected to the uprights 5 and seat member 10, respectively, and to each other whereby they may be arranged to support the seat member 10 as shown in Figs. 1 and 4, or folded into compact condition, as shown in Fig. 2, close against the uprights 5 and between them and the seat member. The folding member 13 preferably comprises a pair of bars $13^a$, $13^a$, pivotally connected at their outer ends to the uprights or main supporting members 5, 5, as shown at 15, and at their inner ends pivotally connected to the folding member 14, as shown at 16. The folding member 14 preferably comprises a main section 17 and sub-sections 18 rigidly connected together in any desired manner, as for example by rivets 19. The sub-sections 18 diverge outwardly for pivotal engagement with the seat member 10 at or near its opposite sides. By preference the sub-sections are pivoted to the flanges 12, as shown at 20. By constructing the folding member 14 so that it will engage the seat member 10 at or near its opposite side edges, I am enabled to support the seat rigidly without danger of its tilting. But if desired the supporting member may comprise a single section 21, (as shown in Fig. 5) pivoted at its upper end substantially centrally of the seat member 10, preferably by means of a pair of angle plates 22, and a pivot 23. As will be understood, the foldable member 14 co-operates with the uprights 5 to support the front and rear edges of the seat member in horizontal position.

Figs. 1 and 4 show the seat member in position for use. To move the seat member into the compact or non-use position, it is first swung upwardly (see Fig. 3) to position the foldable supporting members 13, 14, against and substantially parallel to the uprights and seat member, respectively, and thereafter the seat member 10 is swung about its pivots and the member 14 about its pivotal connection with the foldable member 13 to a position in front of the uprights (see Fig. 2), with the foldable members disposed between the uprights and the seat member 10, the latter thereby serving to cover or hide the foldable members from view. The folding member 14 is of a length to support the seat member 10 horizontally, whereas the folding member 13 is of a length to permit the folding member 14 to be arranged vertically and hence take the weight on the seat member 10 endwise. As the folding member 13 is connected to the folding member 14, it of course serves to maintain its lower end in operative position.

It will be seen from the foregoing description that in my construction the seat member folds downwardly against its main supporting member and the co-operating supporting members fold in between the main supporting member and the seat member, thereby leaving the space above the seat obstructed and providing a cover for the foldable supporting members.

My construction of seat is relatively simple and may be folded into compact condition and occupy minimum space. The construction permits an auxiliary seat to be provided in automobiles independently of the construction of the front seat back. As my seat construction is connected to the floor 4, it can be installed after the vehicle is completed. Further, since the seat is supported entirely upon the floor and the folding member 14 engages the floor and co-operates with the uprights 5 to support the seat member 10 without imparting to the uprights any tilting strains, no connection of the seat construction with the front seat back is required and the uprights may be secured to the floor in a simple manner.

To those skilled in the art of making devices of the class described, many alterations in construction and widely differing embodiments and applications of my invention will suggest themselves, without departing from the spirit and scope thereof. My disclosures and description herein are purely illustrative and are not intended to be in any sense limiting.

What I claim is:

1. In a device of the character described, the combination of front and rear supports arranged to engage the floor at their lower ends, a seat pivotally connected at its front and rear edges to the upper ends of said supports, whereby said seat may swing upwardly and downwardly relative to said rear support, and a connecting member pivotally connected at its opposite ends to the floor engaging ends of said supports and serving to space such ends when said seat is in use, the pivot connections between said connecting member, supports and seat permitting said front support and connecting member to be folded about their connecting pivot into a reversed relationship to dispose the pivot between them substantially in alignment with the pivot between the rear edge of said seat and said rear support, whereby said seat may be swung downwardly into compact relationship with said rear support with the front support and connecting member between them.

2. In a device of the character described, the combination of front and rear supports arranged to engage the floor at their lower ends, said rear support comprising a pair of spaced uprights, a seat pivotally connected at its front and rear edges to the upper ends of said supports, whereby said seat may swing upwardly and downwardly relative to said rear support, and converging connecting members pivotally connected at their rear ends to said uprights and at their front ends to said front support and serving to space the floor engaging ends of said uprights and support when said seat is in use, the pivot connections between said members, supports and seat permitting said front support and connecting members to be folded in a reverse direction about the connecting pivots between them into substantially parallel relationship to dispose such pivot substantially in alignment with the pivot between the rear edge of said seat and said rear support, whereby said seat may be swung downwardly in front of said rear support with the front support and connecting member therebetween.

3. In a device of the character described, the combination of a main support, a seat member pivotally connected at its rear end to the upper end of said support and swingable upwardly and downwardly from its horizontal position, to fold said seat member relative thereto, a pair of members adapted to be connected at their outer ends with and disposed at right angles to said seat member and support, respectively, when the seat is in use, to provide an auxiliary support engaging the floor at its lower end for the front end of said seat and a spacing member between the lower ends of said auxiliary support and said main support, and pivot connections between the inner ends of said auxiliary support and said spacing member permitting them to be moved into parallel relationship with said main support, whereby said seat may be swung downwardly into folded and compact relationship with said main support with said auxiliary support and spacing member disposed between said seat member and main support.

In testimony whereof, I have hereunto signed my name.

EDWARD J. STAHL.